United States Patent [19]
Yokota et al.

[11] Patent Number: 5,441,300
[45] Date of Patent: Aug. 15, 1995

[54] THREE-DIMENSIONAL ACCELERATION SENSOR AND AIRBAG USING THE SAME

[75] Inventors: Yoshihiro Yokota, Katsuta; Akira Koide, Ibaraki; Masahiro Matsumoto, Hitachi; Masahide Hayashi, Katsuta, all of Japan

[73] Assignee: Hitachi, Ltd., Japan

[21] Appl. No.: 978,397

[22] Filed: Nov. 18, 1992

[30] Foreign Application Priority Data

Nov. 18, 1991 [JP] Japan .................................. 3-301514

[51] Int. Cl.$^6$ .............................................. B60R 21/32
[52] U.S. Cl. .................. 280/735; 73/514.32; 361/283.2; 361/283.3
[58] Field of Search ............. 280/734, 735; 73/517 R, 73/517 B; 361/280, 283.1, 283.2, 283.3, 282.4

[56] References Cited

U.S. PATENT DOCUMENTS

| | | | |
|---|---|---|---|
| 4,625,560 | 12/1986 | Sanders | 361/283.1 |
| 4,881,410 | 11/1989 | Wise et al. | 361/283.4 |
| 5,060,504 | 10/1991 | White et al. | 73/517 R |
| 5,095,750 | 3/1992 | Suzuki et al. | 73/517 B |
| 5,101,669 | 4/1992 | Holm-Kennedy et al. | 361/280 |
| 5,151,763 | 9/1992 | Marek et al. | 361/280 |
| 5,233,213 | 8/1993 | Marek | 280/735 |

FOREIGN PATENT DOCUMENTS 2207758  2/1989  United Kingdom ............ 73/517 R

OTHER PUBLICATIONS

A New Modal Mode Controlling Method for a Surface Format Surrounding Mass Accelerometer, K. Yamada and T. Kuriyama, Sensor Research Laboratory, Microelectronics Research Laboratories, NEC Corporation, Shimokuzawa, Sagamihara, Kanagawa, Japan, pp. 655–658.

*Primary Examiner*—Eric D. Culbreth
*Attorney, Agent, or Firm*—Evenson, McKeown, Edwards & Lenahan

[57] ABSTRACT

A three-dimensional acceleration sensor capable of detecting a small acceleration value and even an acceleration value amounting up to 100G occurring in the event of a collision comprises a diaphragm for linking a frame and a massive part and diaphragms and beams for linking the massive part and a central part. These elements are formed by working a single crystalline silicon plate. Gaps between the massive part and opposing electrodes are changed by acceleration applied to the massive part. A circuit connected to terminals detects the changes in gaps as changes in capacitances and determines direction and level of the applied acceleration.

11 Claims, 12 Drawing Sheets

THREE-DIMENSIONAL ACCELERATION SENSOR AND AIRBAG USING THE SAME

BACKGROUND AND SUMMARY OF THE INVENTION

The present invention relates to a three-dimensional acceleration sensor which can be used for an airbag actuated in the event of a collision of such a moving body as an automobile and for an active suspension in car body control.

A conventional three-dimensional acceleration sensor is described in, for example, 91CH2817-5/91, IEEE, 1991, pp. 655–658. The conventional sensor is finely worked through surface micro-machining. Structurally, it has a massive part and a central part provided inside the massive part, and the massive part is suspended by the central part and thin beams.

Since in the conventional apparatus the central part and the massive part are linked by only the thin beams, the sensor faces a problem of poor strength and is allowed to detect only acceleration values of approximately 1G to 2G.

Also, in the conventional sensor, the structure of gap and movable electrode is set up by removing all superfluous layers and consequently the gap is exposed externally, raising a problem that inflow of dirts and moisture to the electrode is inevitable.

An object of the present invention is to provide a three-dimensional acceleration sensor capable of detecting a large value of acceleration.

Another object of the invention is to provide a three-dimensional acceleration sensor which is constructed such that electrodes can be prevented from being deposited with dirts and the like.

To accomplish the above objects, in a three-dimensional acceleration sensor having a support on which a stationary electrode is arranged, a central part fixed to the support, a massive part acting as a movable electrode and a link member for interconnecting the central part and the massive part, the link member is comprised of a combination of diaphragms and beams which are provided around the central part.

Also, to accomplish the above objects in accordance with the present invention, in a three-dimensional acceleration sensor having a support on which a stationary electrode is arranged, a central part fixed to the support, a massive part acting as a movable electrode and a first link member for interconnecting the central part and the massive part, a frame is provided around the massive part, and the frame and the massive part are linked by a second link member comprised of a diaphragm.

According to the invention, in a three-dimensional acceleration sensor having a support on which a stationary electrode is arranged and a massive part acting as a movable part, a frame is provided around the massive part and the frame and the massive part are linked by a link member comprised of a diaphragm.

According to the invention, in a three-dimensional acceleration sensor having a support on which a stationary electrode is arranged and a massive part acting as a movable electrode, the distance between an electrode portion of the massive part and the stationary electrode is larger than that between the support and the massive part.

Since in the invention the central part and the massive part are linked by the diaphragms and beams, strength can be increased to permit detection of even an acceleration value of about 100G.

Further, since the outer frame and the massive part are linked by the diaphragm, inflow or invasion of dirts and moisture from the outside can be prevented to prevent erroneous operation of the massive part.

DESCRIPTION OF THE PREFERRED EMBODIMENTS

Figure 1:
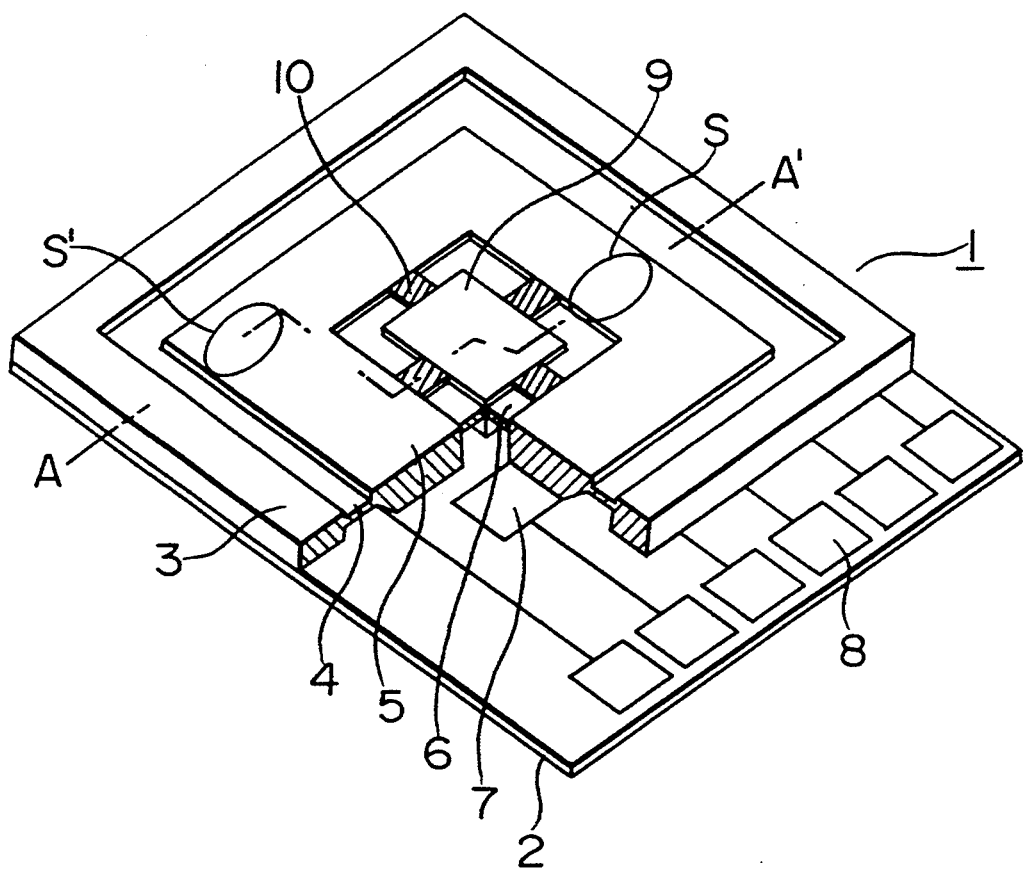
FIG. 1 is a perspective view showing an embodiment of a three-dimensional acceleration sensor according to the invention.
Figure 2:
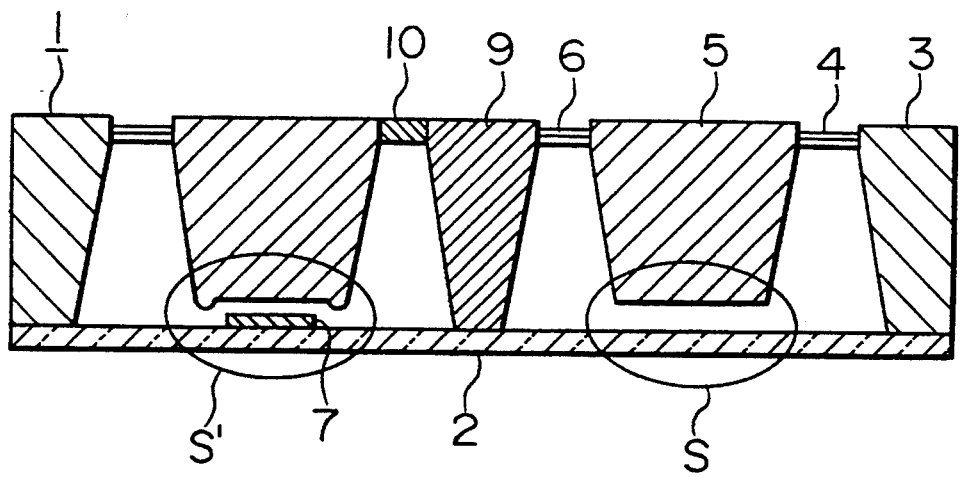
FIG. 2 is a sectional view taken on the line A—A' of FIG. 1.

Referring now to FIGS. 1 and 2, a single crystalline silicon plate 1 is worked to simultaneously form a frame 3, a massive part 5, a diaphragm 4 for interconnecting or linking the frame and massive part, and a central part 9 as well as beams 10 and diaphragms 6 for interconnecting or linking the massive part 5 and the central part 9.

When the massive part 5 is moved in accordance with acceleration, the movement can be brought into balance by a combination of beams 10 and diaphragms 6, and the balance may be additionally taken by the diaphragm 4.

While the massive part 5 is movable, the silicon substrate 1 per se is stationary and formed integrally with a glass plate or support 2 by, for example, anodic bonding as shown in FIG. 1. When a gap G (see FIG. 4) between a stationary electrode 7 formed on glass plate 2 and the massive part 5 changes in accordance with acceleration applied to the opposing massive part 5, a change in the gap complying with the acceleration is detected as a change in capacitance. The detection output is connected to a circuit through a terminal 8 so as to be taken out as an acceleration signal.

Thickness and width of the diaphragms 6 and 4 may be combined in such a way as to find an optimum condition for enabling the massive part 5 to operate steadily in order to detect acceleration values extending from 1 to 3G necessary for car body control up to 100G occurring in the event of a collision.

Figure 11:
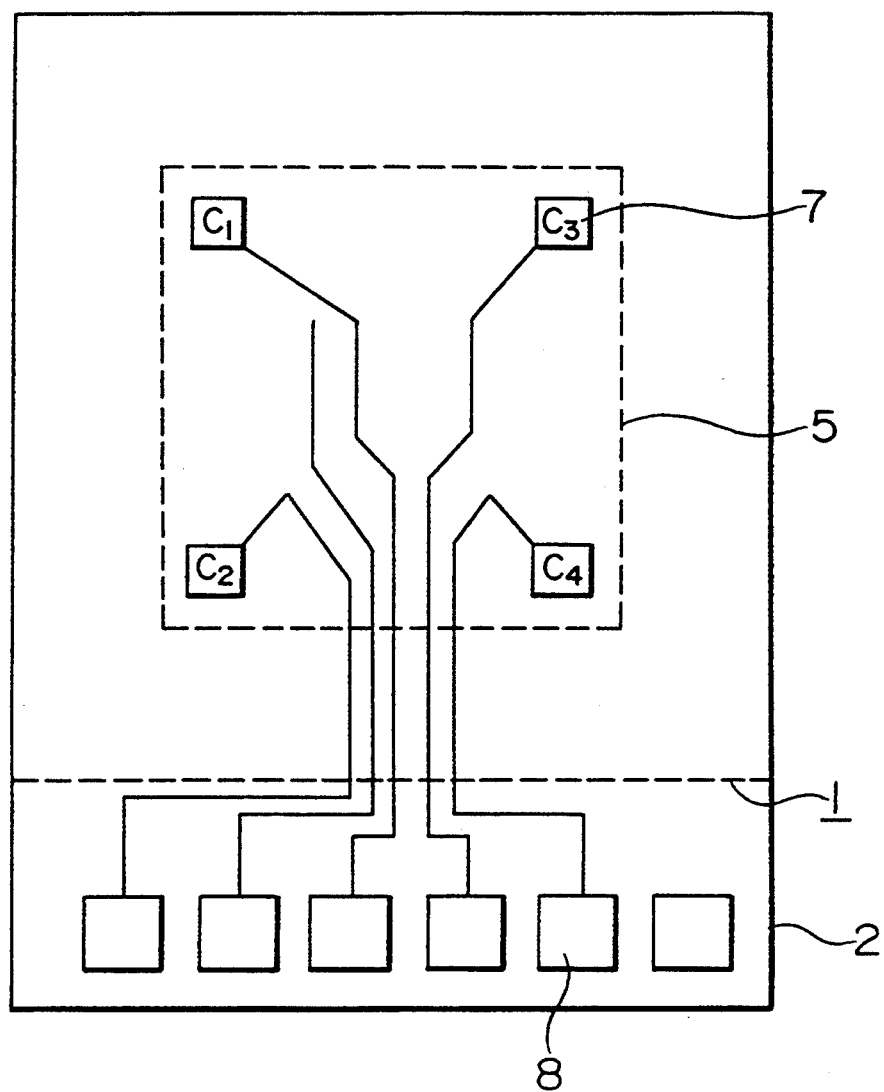
FIG. 11 is a diagram showing an example of an arrangement of electrodes.

The direction of acceleration applied can also be determined by detecting a change in capacitance between the electrode 7 and massive part 5 at a portion S' on the 2,2 section line, which change follows the movement of the massive part 5. To this end, a plurality of electrodes 7 are provided at, for example, four corners of the massive part 5 as shown in FIG. 11. When changes in capacitances $C_1$, $C_2$, $C_3$ and $C_4$ at the four sites are identical with each other, acceleration is so determined as to be applied vertically (Z direction) and when the difference between capacitance $C_1$ and $C_2$ at lefthand two sites and capacitances $C_3$ and $C_4$ at righthand two sites increases or decreases, acceleration is so determined as to be applied in the X direction. In a similar manner, the application of acceleration in the Y direction, which is at 90° angle to the X direction, is determined, so that a three-dimensional acceleration sensor may be provided. More particularly, where changes in capacitances at the respective gaps are $C_1$ to $C_4$, the Z, X and Y directions are determined by as follows:

$$Z \ldots C_1 = C_2 = C_3 = C_4$$

$$X \ldots (C_1, C_2) - (C_3, C_4)$$

$$Y \ldots (C_1, C_3) - (C_2, C_4)$$

Figure 13:
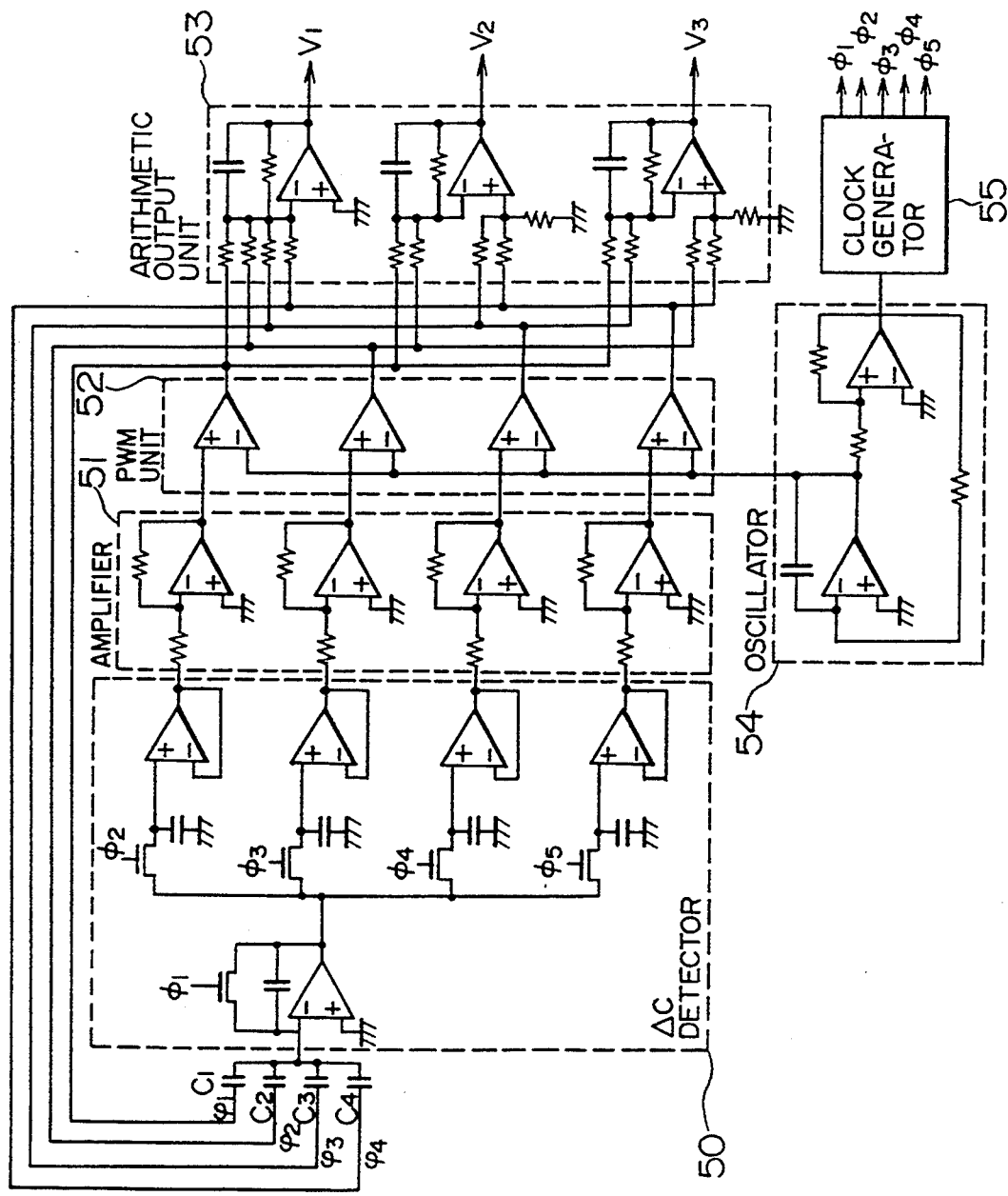
FIG. 13 is a circuit diagram of the three-dimensional acceleration sensor.

The above calculation may be carried out at an arithmetic output unit 53 constituting the final stage of a circuit shown in FIG. 13 to produce outputs $V_1$ (Z direction), $V_2$ (X direction) and $V_3$ (Y direction) on the basis of which the system determines directions of applied acceleration.

Figure 3:
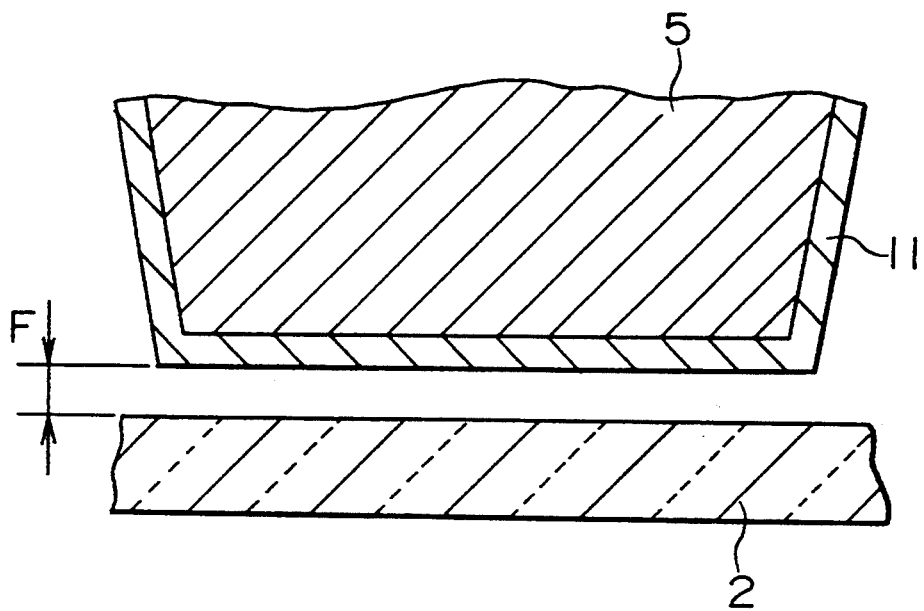
FIG. 3 is an enlarged cross sectional view showing a portion S in FIG. 1.
Figure 4:
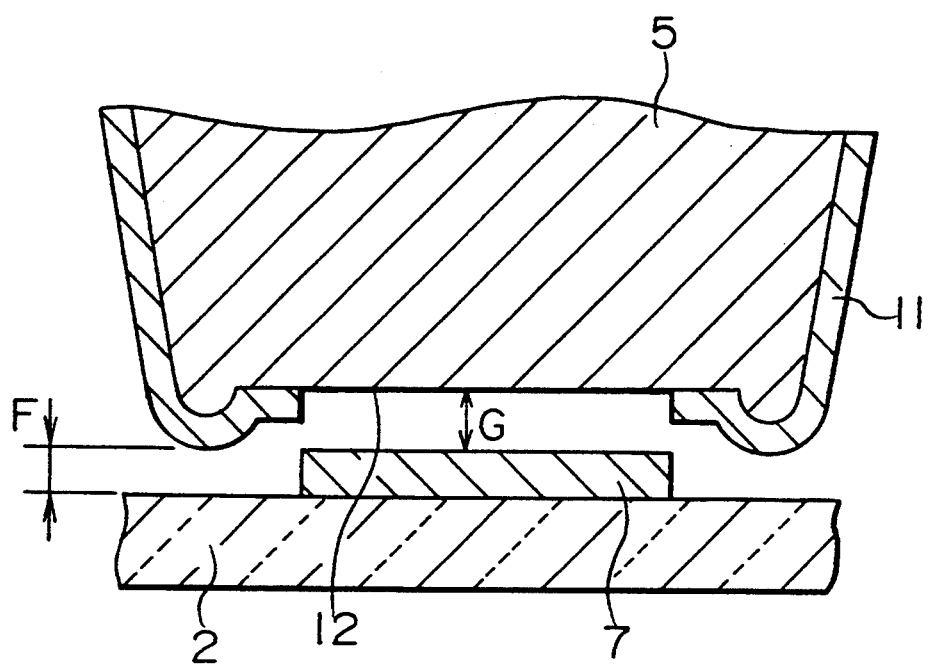
FIG. 4 is an enlarged cross sectional view showing a portion S' in FIG. 1.

Referring now to FIGS. 3 and 4 being enlarged views at portions S and S' of FIGS. 1 and 2, there are illustrated gaps one of which is for detection of capacitance. When electrodes are located at four corners of the massive part 5 as in an example of electrode arrangement shown in FIG. 11, an electrode 7 is present at the S' portion of FIG. 2 but no electrode is present at the intermediate S portion. At the S' portion, the massive part 5 is etched off in advance at its portion corresponding to an electrode portion 12 (FIG. 4) and a $SiO_2$ film 11 is deposited on the massive part to cover the electrode portion 12 as a result, a portion of the massive part opposing an electrode 7 is etched to expose an Si portion of the massive part 5 to form an electrode, as shown in FIG. 4.

Thus, a gap G for capacitance detection can be set up. A gap F for the stopper can also be set up in a similar way as shown in FIG. 4. The gaps constructed as above are effective to prevent a conductor of the electrode 7 from contacting the bare Si portion even when acceleration is applied.

Both the glass plate 2 and the $SiO_2$ film 11 at the gap F for the stopper are insulators which are immune to electrostatic fusion. The gap F is always related to the gap G as follows:

$$F > G.$$

Both gaps F and G are also used in combination to establish a detector of a self-diagnostic circuit. More particularly, a value of the gap G for capacitance detection is detected when the $SiO_2$ film 11 abuts against the glass plate 2 to make the gap F for the stopper zero. If this value falls within a preset range, normality is determined, but if this value takes is outside the range, a fault of the three-dimensional system is determined, raising the alarm. An alarm for warning of abnormality by using the gaps F and G shown in FIGS. 3 and 4 is sophisticated but known and thus simply illustrated at block 58 in FIG. 13.

Further, by making the gap F for the stopper small pursuant to the relation of $F < G$, abnormal vibration of the massive portion 5 can be suppressed.

Figure 5:
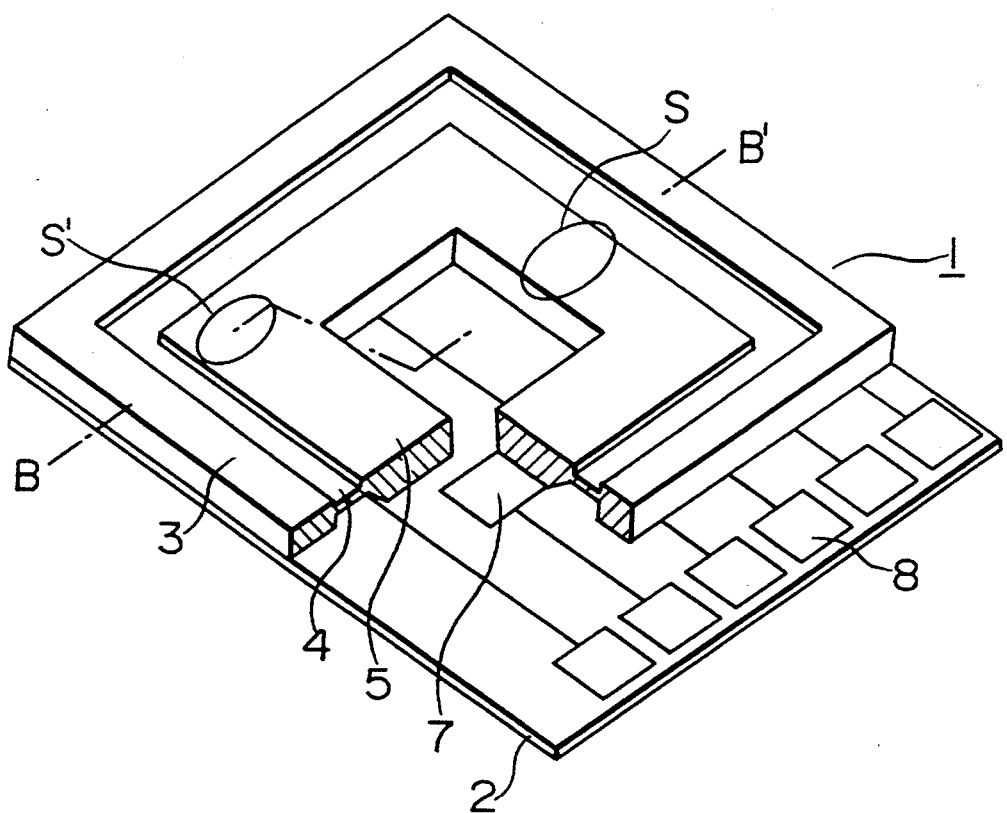
FIG. 5 is a perspective view showing a second embodiment of the three-dimensional acceleration sensor according to the invention.
Figure 6:
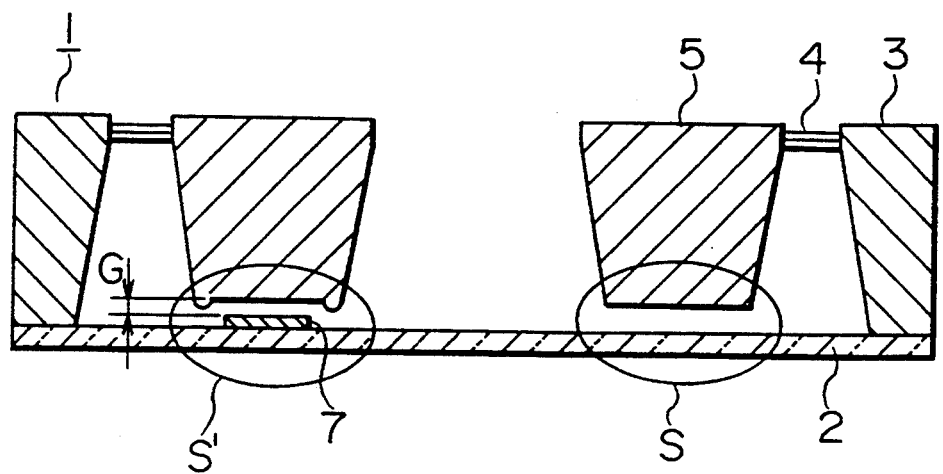
FIG. 6 is a sectional view taken on the line B—B' of FIG. 5.

FIGS. 5 and 6 show a second embodiment of the invention in which the central part 9 and the diaphragms 6 and beams 10 connected thereto of the FIG. 1 embodiment are removed. The operation of this embodiment is similar to that of FIG. 1, and structurally, this embodiment is simplified as compared to the FIG. 1 structure but the load on the diaphragm 4 becomes larger.

Figure 7:
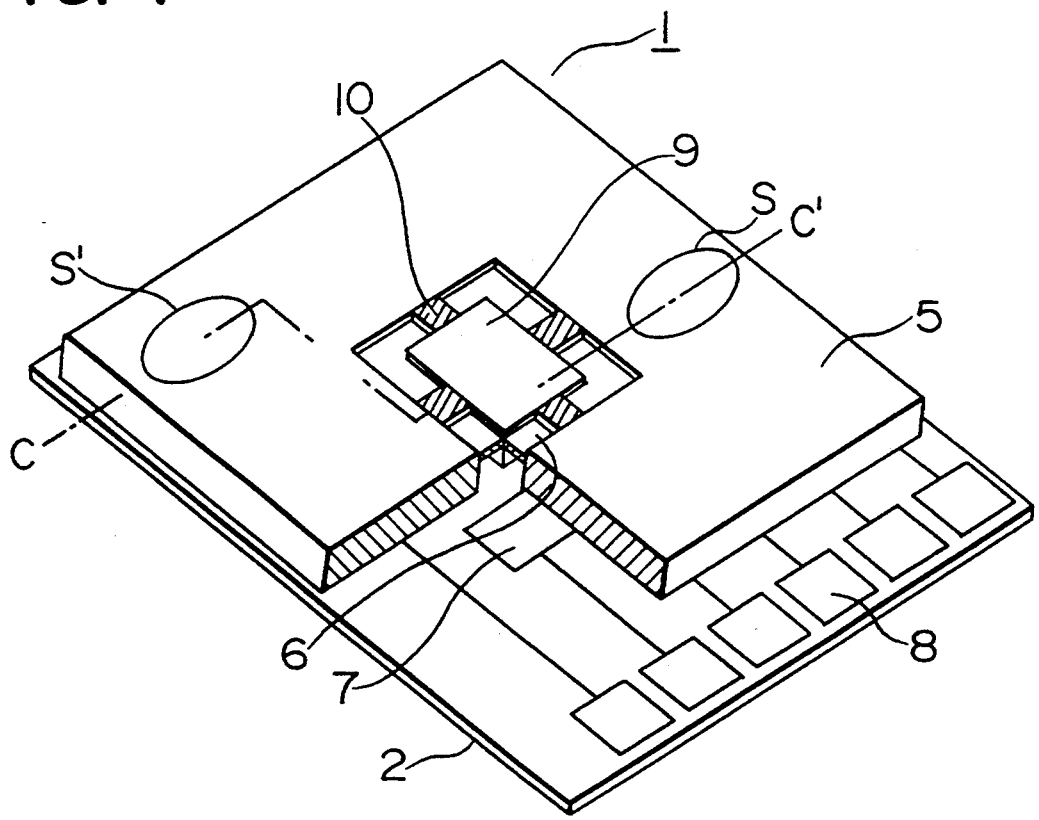
FIG. 7 is a perspective view showing a third embodiment of the three-dimensional acceleration sensor according to the invention.
Figure 8:
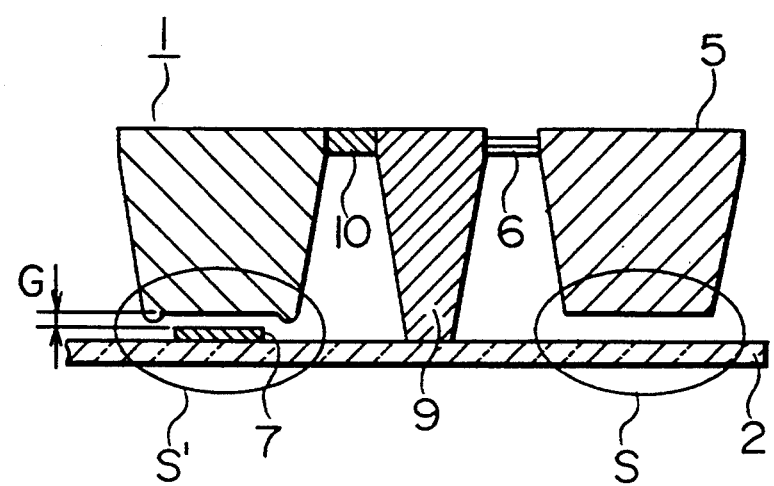
FIG. 8 is a sectional view taken on the line C—C' of FIG. 7.

FIGS. 7 and 8 show a third embodiment of the invention in which the frame 3 and diaphragm 4 connected thereto of the FIG. 1 structure are removed. Structurally, this embodiment can measure three-dimensional acceleration as in the case of the structure of FIGS. 5 and 6 and is advantageous in that the massive part 5 can operate lightly.

Figure 9:
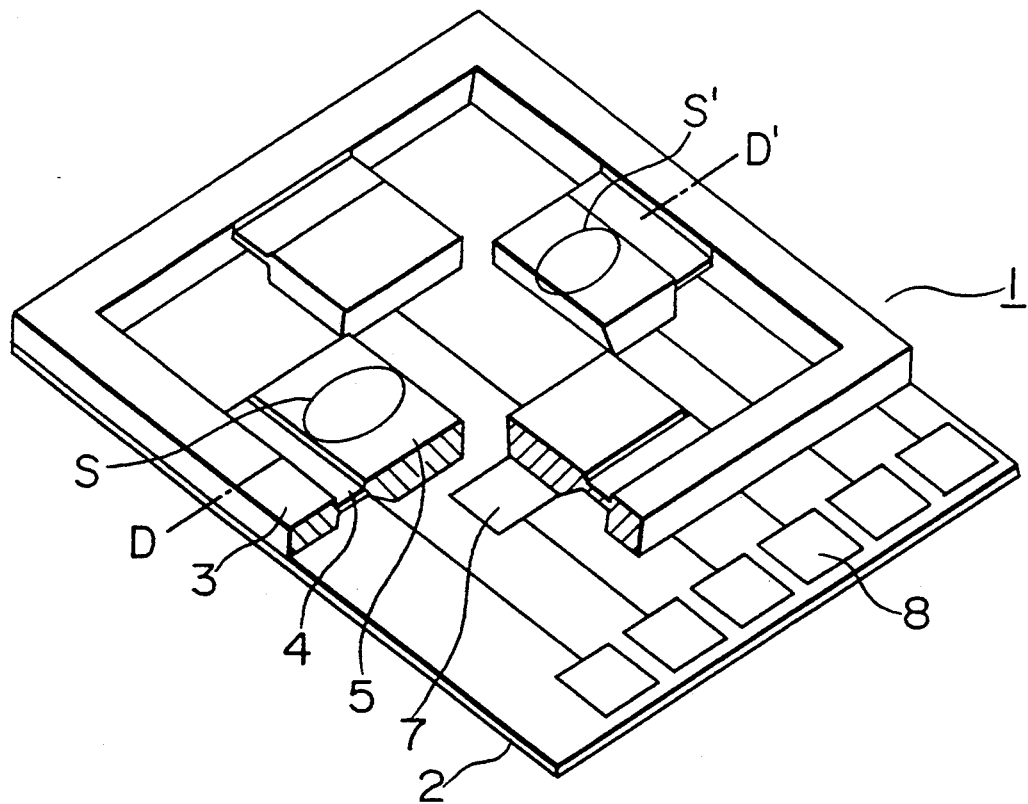
FIG. 9 is a perspective view showing a fourth embodiment of the three-dimensional acceleration sensor according to the invention.
Figure 10:
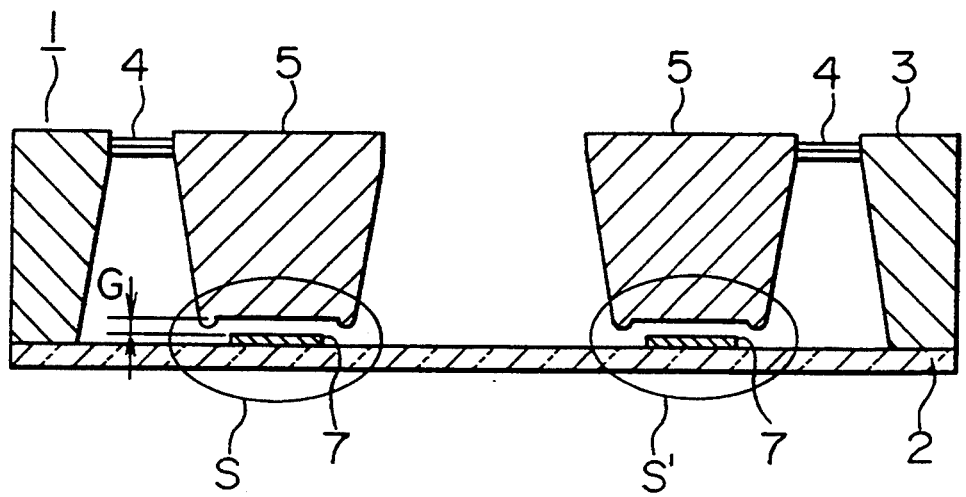
FIG. 10 is a sectional view taken on the line D—D' of FIG. 9.

FIGS. 9 and 10 show a fourth embodiment of the invention which has the same construction as that of FIGS. 5 and 6 with the only exception that the massive part 5 is divided into parts under which opposing electrodes 7 are provided. Structurally, this embodiment corresponds to a combination of four cantilevered unitary massive parts and, like the foregoing embodiments, can measure three-dimensional acceleration.

FIG. 11 shows a typical example of an arrangement of electrodes 7 for use in the previously-described structure of three-dimensional acceleration sensor. In FIG. 1 and other figures, wiring conductors extend from respective electrodes 7 to respective terminals 8 and disadvantageously the silicon plate 1 and glass plate 2 are jointed together by, for example, anodic bonding with a large gap necessary for taking out the wiring conductors remaining therebetween, so that filling the gap will be needed and/or a defective joint will occur. To cope with this problem, as exemplified in FIG. 11, wiring lines are established by etching technique in such a manner that the wiring lines first extend from the electrodes 7 toward a central region so as not to disturb balance of the massive part 5, then concentrate at an edge (dotted line position) of the silicon plate and finally go out of the silicon plate to connect to the respective terminals 8.

Figure 12:
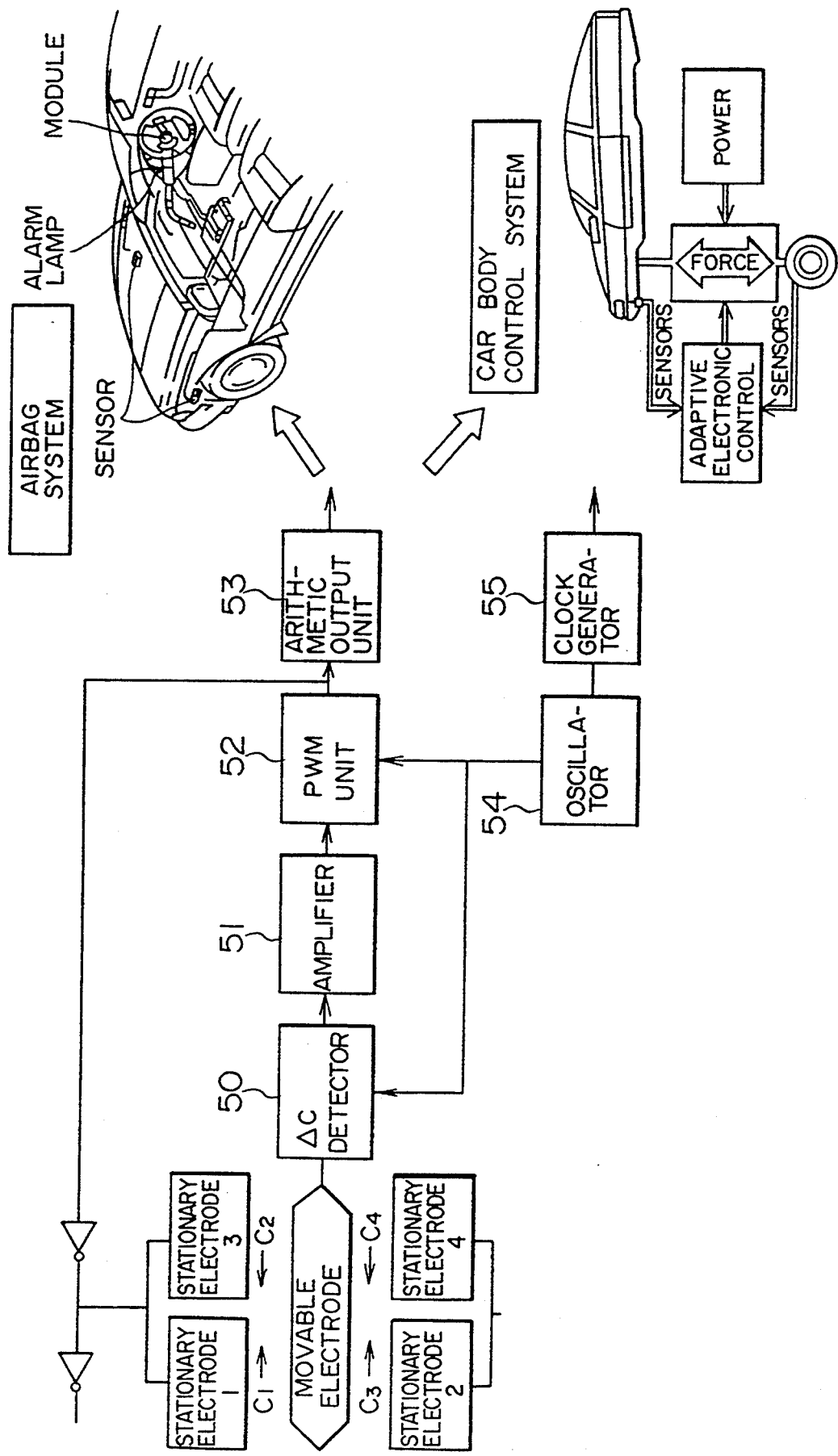
FIG. 12 is a block diagram of the three-dimensional acceleration sensor.

FIG. 12 shows a block diagram of the three-dimensional, semiconductor capacitive type acceleration sensor set forth so far. Illustrated therein is a circuit which detects a three-dimensional output by detecting changes in capacitances between a movable electrode corresponding to the massive part 5 and stationary electrodes $C_1$ to $C_4$ and by subjecting detection outputs to arithmetic processing. In FIG. 12, the circuit is depicted as being exemplarily applied to an airbag system and a vehicle control system. In the former application, the three-dimensional acceleration sensor of the invention capable of detecting a large acceleration value occurring in the event of a collision is used to produce an output based on which an airbag inflation is started.

The circuit of FIG. 12 is more specifically shown in FIG. 13. Advantageously, this specific circuit in which electrostatic capacities C1, C2, C3, C4 correspond to the respective electrodes 7 in FIG. 11, is so constructed as to eliminate interference between signals in order to detect capacitance between each electrode and the massive part with high accuracy. To this end, signals are dephased from each other. Further, an arithmetic circuit for deciding the direction of applied acceleration is provided which produces output signals used to decide the applied acceleration direction.

A change in capacitance between each electrode and the massive part is detected by a $\Delta C$ detector 50, amplified by an amplifier unit 51 and modulated by a PWM unit (pulse width modulation unit) 52, thus providing signals to be operated by the arithmetic output unit 53 which in turn delivers voltage $V_1$ indicative of acceleration in the Z direction, voltage $V_2$ indicative of acceleration in the X direction and voltage $V_3$ indicative of acceleration in the Y direction, these voltages being used to decide three-dimensional acceleration.

Figure 14:
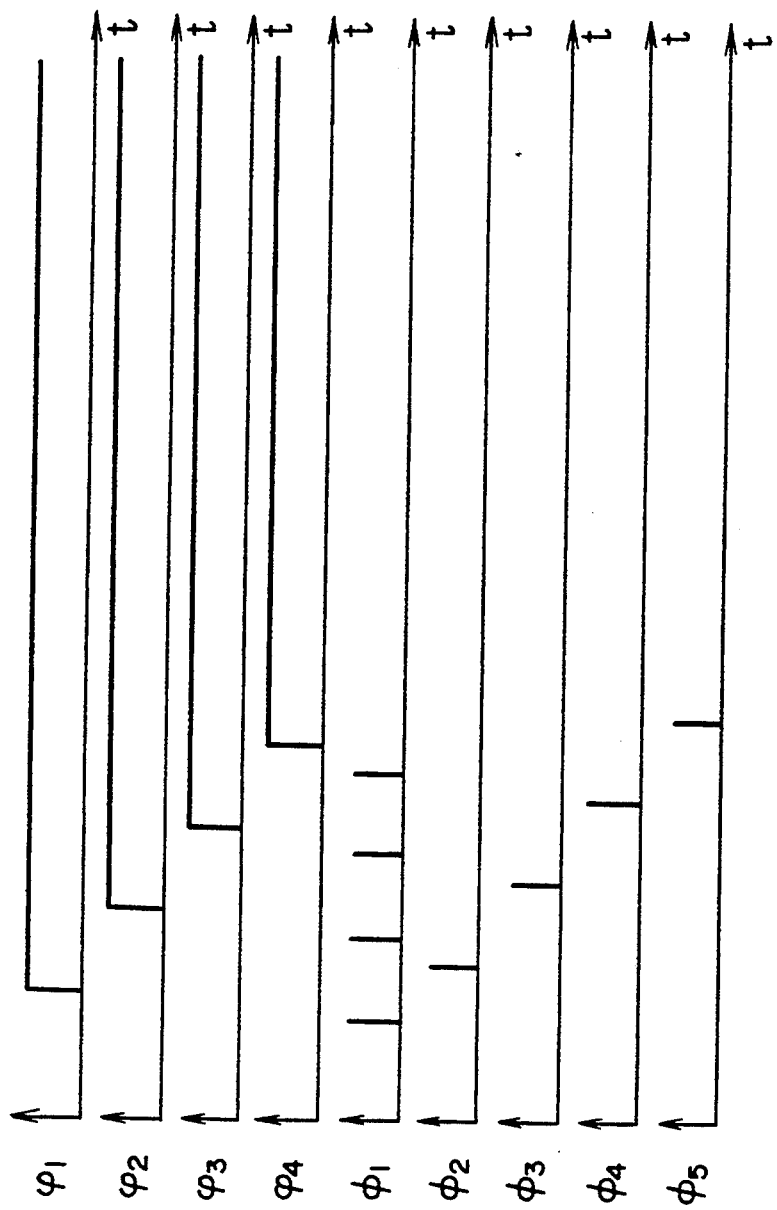
FIG. 14 is a timing chart for the three-dimensional acceleration sensor circuit.

FIG. 14 is a timing chart for the circuit of FIG. 13. As will be seen from the illustration, signals $\Phi 1$ to $\Phi 4$ are dephased from each other. In the three-dimensional acceleration sensor of the invention, not only the beams 10 and diaphragms 6 for supporting the central part 9 are used in combination as described in the foregoing but also the beams or the diaphragms alone may be used.

Figure 15:
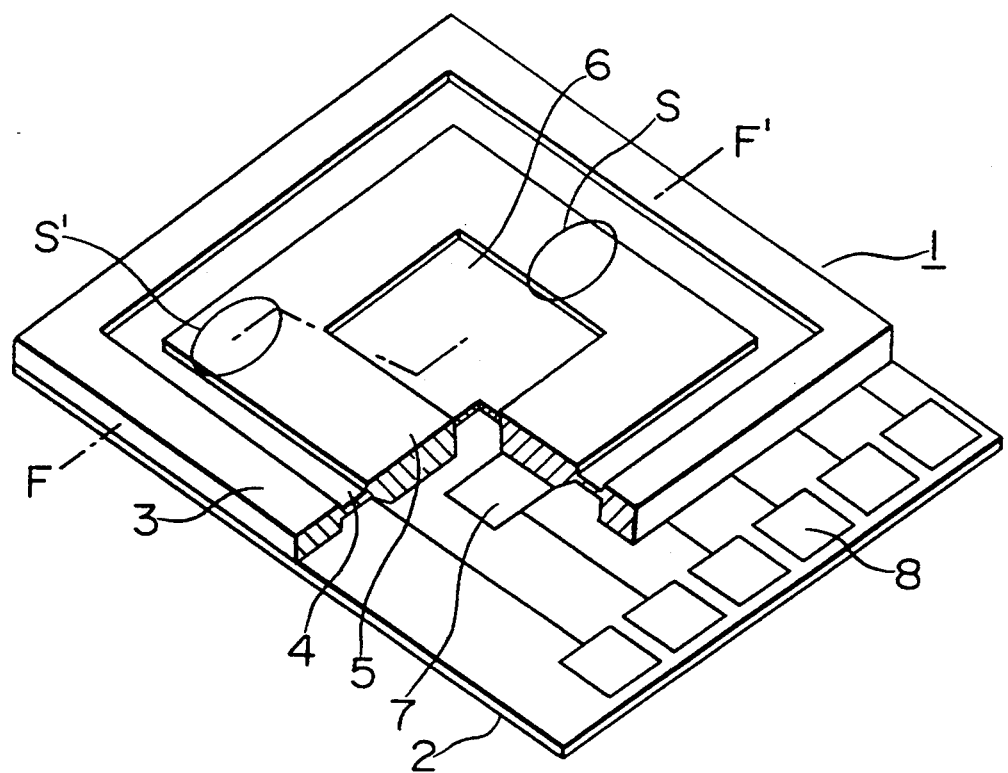
FIG. 15 is a perspective view showing a fifth embodiment of the three-dimensional acceleration sensor according to the invention.
Figure 16:
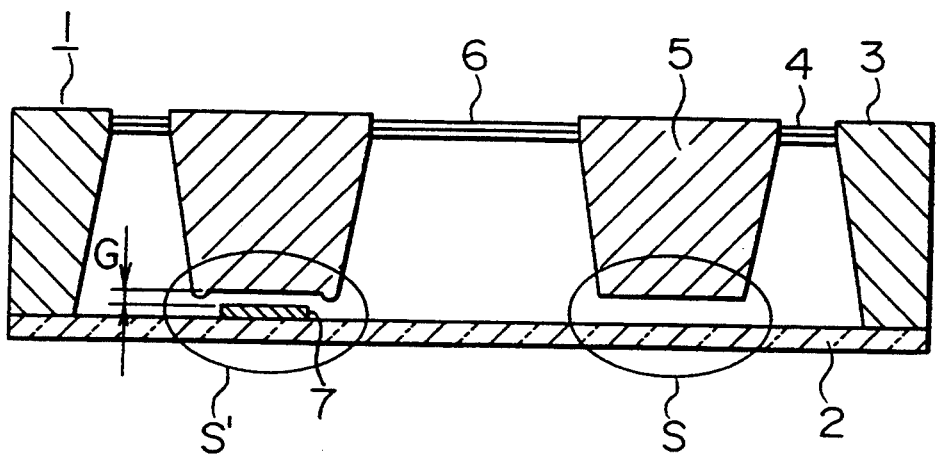
FIG. 16 is a sectional view taken on the line F—F' of FIG. 15.
Figure 17:
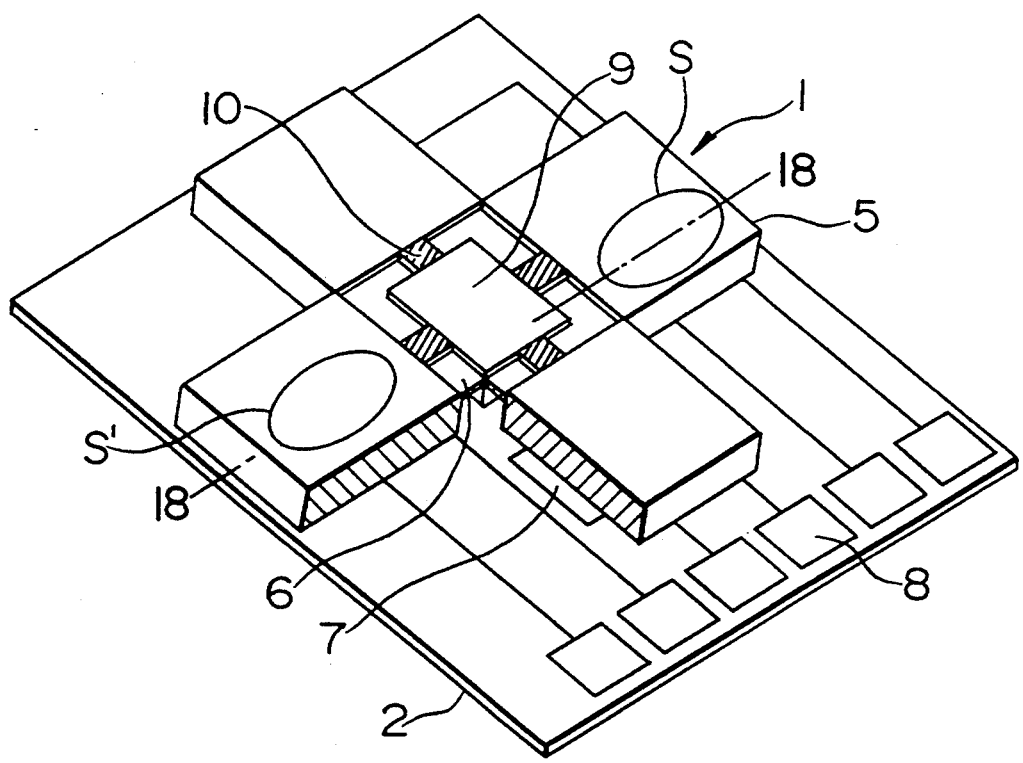
FIG. 17 is a perspective view showing a sixth embodiment of the three-dimensional acceleration sensor according the invention.
Figure 18:
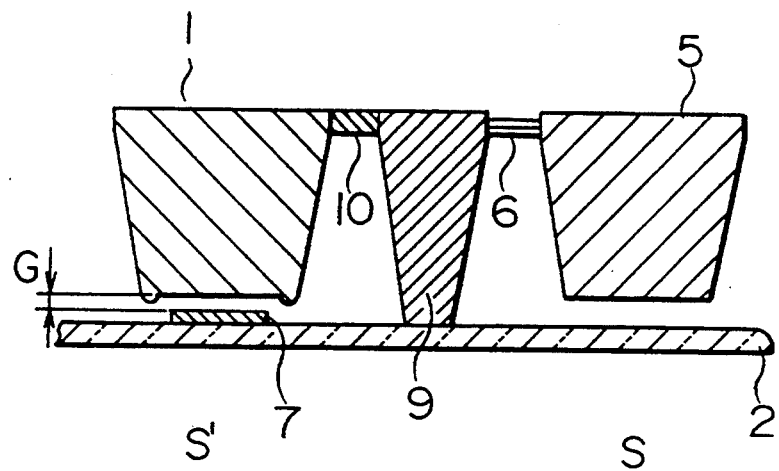
FIG. 18 is a sectional view taken on the line E—E' of FIG. 17.

Generally speaking, FIG. 14 shows the timing relationships between the driving signals $\Phi 1$–$\Phi 5$ generated by the clock generator 55 in FIG. 13 for being applied to gates in the circuit of FIG. 13 and the pulse width signals $\Phi 1$–$\Phi 4$ associated with the stationary electrodes C1–C4. In the embodiment of FIGS. 15-16, FIG. 16 being a sectional view taken along line 16—16 of FIG. 15, a massive part 5 has its outer side contiguous to a diaphragm 4 and its inner side contiguous to a diaphragm. Excepting a differently structured massive part 5, the embodiment of FIGS. 17 and 18 has the same construction as the FIG. 1 embodiment and with a simplified construction it can attain similar effects to those achieved by the FIG. 1 embodiment.

The acceleration sensor of the present invention can detect a small acceleration value occurring in car body control for automobiles and the like and besides a large acceleration value of, for example, 100G caused by a collision.

In addition, inflow of dirts and the like into the detector can be prevented to prevent erroneous detection.

We claim:

1. A three-dimensional acceleration sensor having a support on which a stationary electrode is arranged, a central part fixed to said support, a single massive part constituting a movable electrode, a link arrangement for interconnecting said central part and said single massive part, and comprised of diaphragms and beams which are operatively provided around said central part, means for sensing changed electrical capacitance between the stationary electrode and the single massive part at four positions of the sinqle massive part, and means for detecting applied acceleration in response to changes in sensed electrical capacitance at the four positions by addition and subtraction of change electrical capacitance values.

2. The three-dimensional acceleration sensor according to claim 1, wherein said central part has a square form and said beams are provided at respective sides of the square form.

3. The three-dimensional acceleration sensor according to claim 1, wherein a center of said central part coincides with a center of gravity of a part comprised of said central and massive parts.

4. The three-dimensional acceleration sensor according to claim 1, wherein said detecting means comprises a circuit configured to decide the direction of applied acceleration by detecting changes in capacitance between said massive part and a plurality of opposing stationary electrodes.

5. The three-dimensional acceleration sensor according to claim 4, wherein wiring lines are etched on the support from the stationary electrodes and are configured to avoid disturbing balance of said massive part.

6. A three-dimensional acceleration sensor according to claim 1, wherein
a distance between an electrode portion of said massive part and said stationary electrode is larger than a distance between said support and said massive part.

7. The three-dimensional acceleration sensor according to claim 6, wherein said detecting means comprises a circuit which decides the direction of applied acceleration by detecting changes in capacitances between said massive part and a plurality of opposing stationary electrodes.

8. The three-dimensional acceleration sensor according to claim 7, wherein wiring lines are etched on the support from the stationary electrodes and are configured to avoid disturbing balance of said massive part.

9. The three-dimensional acceleration sensor according to claim 1, wherein a frame surrounds said single massive part, and a second diaphragm links said frame and said single massive part.

10. A three-dimensional acceleration sensor, comprising a stationary electrode, a support on which the stationary electrode is arranged and a single massive part, constituting a movable electrode,
a frame surrounding said single massive part a link member comprised of a diaphragm and linking said frame and said single massive part, means for sensing changed electrical capacitance between the stationary electrode and the single massive part at four positions of the single massive part, and means for detecting applied acceleration in response to changes in sensed electrical capacitance at the four positions by addition and subtraction of change electrical capacitance values.

11. The three-dimension acceleration sensor according to claim 10, wherein a distance between an electrode portion of said massive part and said stationary electrode is larger than a distance between said support and said massive part.

* * * * *